United States Patent
Ober et al.

(10) Patent No.: US 7,717,350 B2
(45) Date of Patent: May 18, 2010

(54) PORTABLE COMPUTING PLATFORM HAVING MULTIPLE OPERATING MODES AND HETEROGENEOUS PROCESSORS

(75) Inventors: Robert Ober, San Jose, CA (US); William T. Edwards, Austin, TX (US); R. Stephen Polzin, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 979 days.

(21) Appl. No.: 11/478,740

(22) Filed: Jun. 30, 2006

(65) Prior Publication Data

US 2008/0028245 A1    Jan. 31, 2008

(51) Int. Cl.
*G06K 19/06* (2006.01)
*G06K 7/00* (2006.01)

(52) U.S. Cl. .................... 235/492; 235/486

(58) Field of Classification Search .......... 235/375, 235/380, 472.1, 472.2, 472.3, 487, 486, 492
See application file for complete search history.

(56) References Cited

U.S. PATENT DOCUMENTS

| | | | |
|---|---|---|---|
| 4,823,256 A * | 4/1989 | Bishop et al. | 714/10 |
| 6,513,057 B1 * | 1/2003 | McCrory | 718/102 |
| 7,216,242 B2 | 5/2007 | Glass | |
| 7,401,165 B2 * | 7/2008 | Nishimoto et al. | 710/14 |
| 2004/0064746 A1 * | 4/2004 | Nishimoto et al. | 713/323 |
| 2007/0013702 A1 * | 1/2007 | Hiroi et al. | 345/502 |
| 2008/0028245 A1 * | 1/2008 | Ober et al. | 713/324 |
| 2009/0070629 A1 * | 3/2009 | Arora et al. | 714/32 |

* cited by examiner

*Primary Examiner*—Thien M Le
(74) *Attorney, Agent, or Firm*—Meyertons, Hood, Kivlin, Kowert & Goetzel, P.C.; Stephen J. Curran

(57) ABSTRACT

A portable computer system such as a laptop computer, for example, includes a first processor that may execute instructions corresponding to application software during a first mode of operation. The portable computer system also includes a second processor that may execute the instructions during a second mode of operation. The first processor and the second processor may be heterogeneous processors. Further, operation of the first processor and the second processor in the first mode and the second mode may be dependent upon which of a plurality of system preferences have been selected.

25 Claims, 4 Drawing Sheets

PORTABLE COMPUTING PLATFORM HAVING MULTIPLE OPERATING MODES AND HETEROGENEOUS PROCESSORS

BACKGROUND OF THE INVENTION

1. Field of the Invention

This invention relates to portable computing systems and, more particularly, to operating modes and power management of portable computing systems.

2. Description of the Related Art

Since the introduction of personal computing machines, portability of the computing environment has been in demand. As the computing power and speed of the processors that drive the computing platforms has increased so has the demand for this portability. However, there are some drawbacks to portable computing platforms. For example, some portable machines have less performance than their desktop counterparts. In addition, battery life can be relatively short, thereby limiting productivity in some cases. Although many newer laptops include some form of power management that addresses some of the power concerns, in many cases, this equates to simply turning off or placing the computer in a sleep mode when the computer has not been in use for some amount of time, for example. As more and more functionality is added to portable computing platforms, it may be desirable to improve the power management and overall performance of portable computer systems.

SUMMARY

Various embodiments of a portable computer system including multiple operating modes and heterogeneous processors are disclosed. In one embodiment, the portable computer system includes a first processor that may execute instructions corresponding to application software during a first mode of operation. The portable computer system includes a second processor that may execute the instructions during a second mode of operation. The first processor and the second processor may be heterogeneous processors. Further, operation of the first processor and the second processor in the first mode and the second mode may be dependent upon which of a plurality of system preferences have been selected.

In one implementation, the portable computer system may include a power management unit that may cause the first processor and the second processor to operate in the first mode and the second mode.

In another implementation, one or more of the plurality of system preferences may be selected by a user.

In yet another specific implementation, the portable computer system may include a wireless module configured to provide wireless access to a wireless network.

In another embodiment, the portable computer system includes a first processor that may execute instructions corresponding to application software and a second processor configured to execute the instructions. In addition, the first processor and the second processor may be heterogeneous processors. The portable computer system may also include a power management unit that may be selectably configured to cause one of the first processor and the second processor to execute the instructions.

Figure 1:
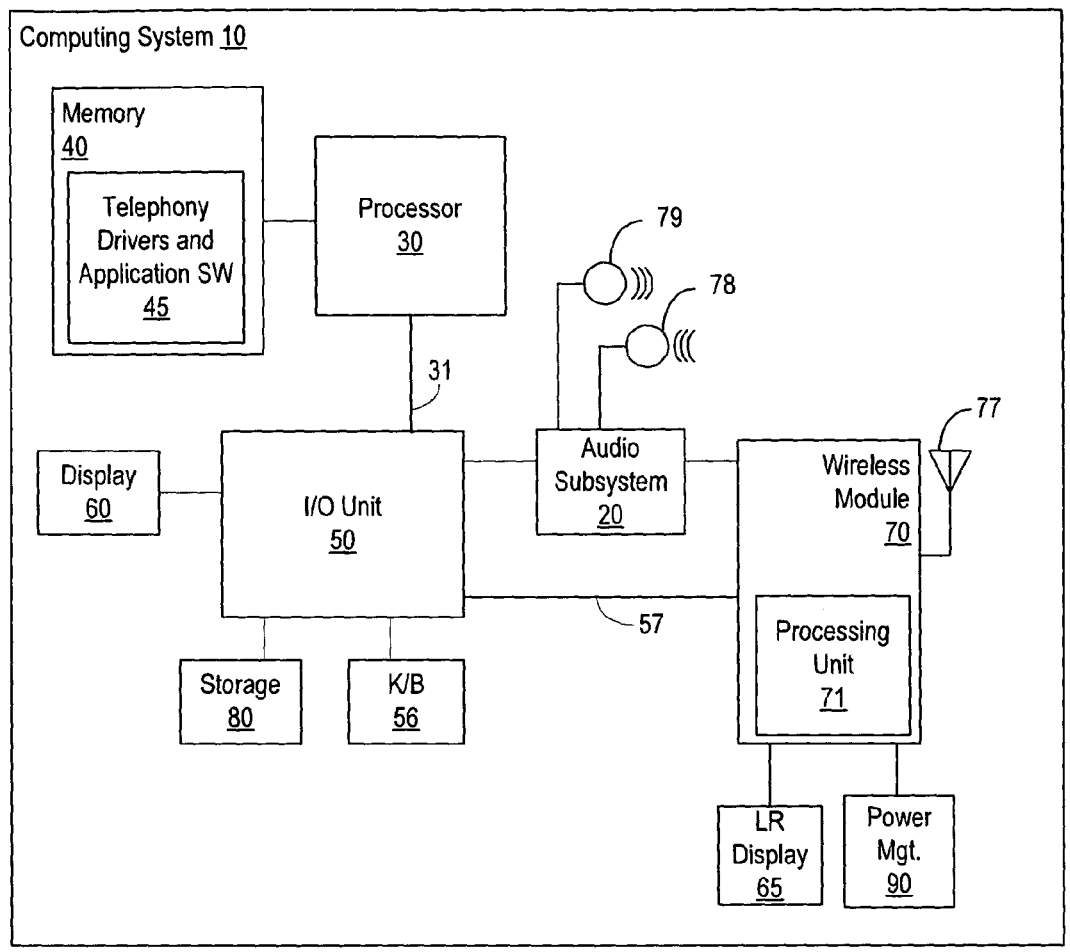
FIG. 1 is a block diagram of one embodiment of a portable computer system including wireless communication functionality.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Turning now to FIG. 1, a block diagram of one embodiment of a portable computer system including wireless functionality is shown. Portable computer system 10 includes a processor 30 coupled to a memory 40 and to an input/output (I/O) unit 50. I/O hub 50 is coupled to various I/O devices such as a display 60, a storage device 80, a keyboard 56, and a wireless module 70. Wireless module 70 is coupled to a low-resolution display 65, and a power management unit 90. In addition, an audio subsystem 20 is coupled between I/O unit 50 and wireless module 70.

It is noted that computer system 10 may include various other components and circuits that have been omitted for simplicity. It is further noted that the components of the computing subsystem are depicted in FIG. 1 for illustrative purposes. It is contemplated that the functionality associated with the various components may be distributed differently such that the lines between blocks may be drawn differently. Moreover, it is entirely possible that the functionality shown in FIG. 1 may be implemented on a single integrated circuit chip, such a system on a chip (SOC) implementation, as desired.

In the illustrated embodiment, processor 30 may be illustrative of a microprocessor that implements the x86 architecture. Although in other embodiments, processor 30 may be any type of processor implemented with any type of architecture. In one embodiment, processor 30 may include a memory controller (not shown) to facilitate memory transactions directed to memory 40, for example. In addition, processor 30 may include various interface circuits such as a host interface (not shown) for controlling transactions with I/O unit 50.

I/O unit 50 may be any of a variety of I/O controllers that may include bridging and graphics circuits (not shown) that may be used as interfaces between processor 30 and the various I/O devices and buses to which it is coupled. For example, in one embodiment, I/O unit 50 may be coupled to processor 30 via a HyperTransport™ link 31. In such an embodiment, I/O unit 50 may include one or more Hyper-Transport™ to peripheral component interconnect (PCI) and/or a HyperTransport™ to universal serial bus (USB) bridges for connection to PCI and USB devices, respectively, for example. In addition, in one embodiment, I/O unit 50 may be coupled to wireless module 70 via a USB, HyperTransport™ or other type of link 57, although other interconnects are contemplated. Further, I/O unit 50 may include and graphics functionality for generation of the various signals used in association with display 60 and LR display 65, for example.

The audio subsystem 20 may include audio functionality including analog-to-digital and digital to-analog circuits for generation of the various signals associated with microphone 79 and speaker 78, for example.

Storage 80 may be a mass storage device. For example, in one embodiment storage 80 may include one or more hard disk drives. In other embodiments, storage 80 may include other types of storage media such as a non-volatile random access memory (RAM) device (e.g., a memory stick, flash drive, etc.), compact disk (CD) drive, digital video disk (DVD) drive, tape drive, floppy drive, and the like.

In one embodiment, display 60 may be a liquid crystal display (LCD) or other type of displays such as may be common to portable laptop and notebook computers. In contrast, LR display 65 may be a display such as the type of display used on a mobile telephone or a personal digital assistant (PDA) for example. In one embodiment, LR display 65 may have a lower resolution than display 60. As will be described in greater detail below, in some modes of operation of portable computer system 10, LR display 65 may be used exclusively, while in other modes, display 60 may be used exclusively, and in still other modes, both displays may used concurrently.

As shown, wireless module 70 is coupled to an antenna 77. Wireless module 70 includes a processing unit 71. Wireless module 70 may include the functionality of a wireless communication device such as a mobile telephone, for example. As such, in one embodiment, processing unit 71 may execute instructions and perform functions, and may include analog, digital, radio frequency (RF) and baseband circuits (not shown) that may function to perform such tasks as RF signal reception and transmission, up-conversion and down-conversion of the RF signals, analog-to-digital conversion, digital-to-analog conversion, digital signal processing of the baseband signals, as well as monitoring and control functions. Accordingly, in various implementations, processing unit 71 may include hardware that includes a separate processor such as an advanced RISC machine (ARM) processor, for example, a digital signal processing unit, and/or one or more hardware accelerators for handling complex algorithms.

Wireless module 70 may communicate with a wireless network, such as a wireless telephone network, for example. The wireless network may conform to any of a variety of communication standards that may be compatible with various technologies such as the second (2G), third (3G) and fourth (4G) generation mobile phone technologies. In addition, the wireless network may be a wireless wide area network implemented using such protocols as WiMax, WiBro, NextNet, and others. More particularly, in various embodiments, wireless module 70 may employ a time-division multiple access (TDMA), a code division multiple access (CDMA) and/or a wireless CDMA (WCDMA) technique to implement standards such as the Global System for Mobile Communications (GSM) standard, the Personal Communications Service (PCS) standard, and the Digital Cellular System (DCS) standard, for example. In addition, many data transfer standards that work cooperatively with the various technology platforms may also be supported. For example, wireless module 70 may also implement the General Packet Radio Service (GPRS) standard, the Enhanced Data for GSM Evolution (EDGE) standard, which may include Enhanced General Packet Radio Service standard (E-GPRS) and Enhanced Circuit Switched Data (ESCD), and the high speed circuit switched data (HSCSD) standard, high speed downlink packet access (HSDPA), high speed uplink packet access (HSUPA), evolution data optimized (EV-DO), among others.

In one embodiment, memory 40 may be a system memory that is used to store instructions and data that may be used by processor 30 as well as other devices (e.g., I/O unit 50). In various embodiments, memory 40 may be implemented using any of a variety of volatile or non-volatile memory devices. For example, memory 40 may be implemented using any number of memory devices in the dynamic RAM family of devices. In one embodiment, memory 40 may be implemented using removable or non-removable memory modules with the memory devices affixed thereto. However, other memory device configurations are possible and contemplated.

As shown, memory 40 includes telephony drivers and application software 45 stored therein. It is noted that telephony drivers and application software 45 may be stored more permanently within storage 80 and during run time, at least portions of the instructions and data being executed by processor 30 may be loaded into memory 40.

Portable computer system 10 may include a computing subsystem and a wireless subsystem. In one embodiment, the computing subsystem may include the components that typically make up a general computing platform. For example, the computing subsystem may include processor 30, memory 40, I/O unit 50, display 60, and so on. The wireless subsystem may include wireless module 70, which includes processing unit 71, and LR display 65. As will be described in greater detail below, in one embodiment, portable computer system 10 may operate in various modes. It is contemplated that the system architecture of the computing subsystem may follow a more conventional Personal Computer (PC) architecture that uses a Northbridge and/or Southbridge arrangement. However, this type of architecture is also well-known and is not discussed here for brevity. It is worth mentioning that in such a system, the wireless module 70 may be connected to the Northbridge via any type of interconnect such as a USB link, for example.

During operation of portable computer system 10, either subsystem may be used alone, or both subsystems may be used together in various combinations. For example, in one mode, portable computer system 10 may operate such that only the wireless module 70 may be in operation while the computing subsystem components may be in a standby or low power state. As such, portable computer system 10 may be operated as a wireless communication device such as a mobile telephone or a personal digital assistant (PDA). In such an embodiment, LR display 65 may be used. In another mode, the wireless subsystem may be turned off or placed in a standby mode and portable computer system 10 may operate simply as a laptop or notebook computer. In still other modes, portable computer system 10 may operate using various combinations of computing and wireless communication functionality. It is noted that while portable computer system 10 is operated in the different modes, one or more components may be powered down or placed in a standby mode or other low power states. As such, portable computer system 10 includes a power management unit 90 that may manage the different modes and power states and any switching therebetween.

Depending upon the application software and drivers that may be installed, portable computer system 10 may function as a laptop computer with a fully integrated wireless communication platform that includes voice and data transfer functionality. In addition, due to the integration of the wireless hardware and the telephony drivers and application software 45 on the portable computing platform, the management of various email, address books, and other files may be seamless to a user. For example, the telephony drivers and application software 45 may include instructions that may be used to configure the wireless module 70. In one implementation, a user may select a driver via the operating system or other mechanism, for example. The driver may configure one or more operational characteristics and/or behaviors of wireless module 70. In addition, the telephony drivers and application software 45 may be used to manage email, address books, phone lists, databases, calendars, and other information traditionally used on a mobile telephone. The application software may also include applications that may be run by processor 30 such as spreadsheet, word processing, games, and the like. Once the user configures the system operation, such operations as managing general IP data traffic, receiving incoming calls, sending outgoing calls, receiving and sending email, and display management may be fully automated from a platform user perspective.

Figure 2:
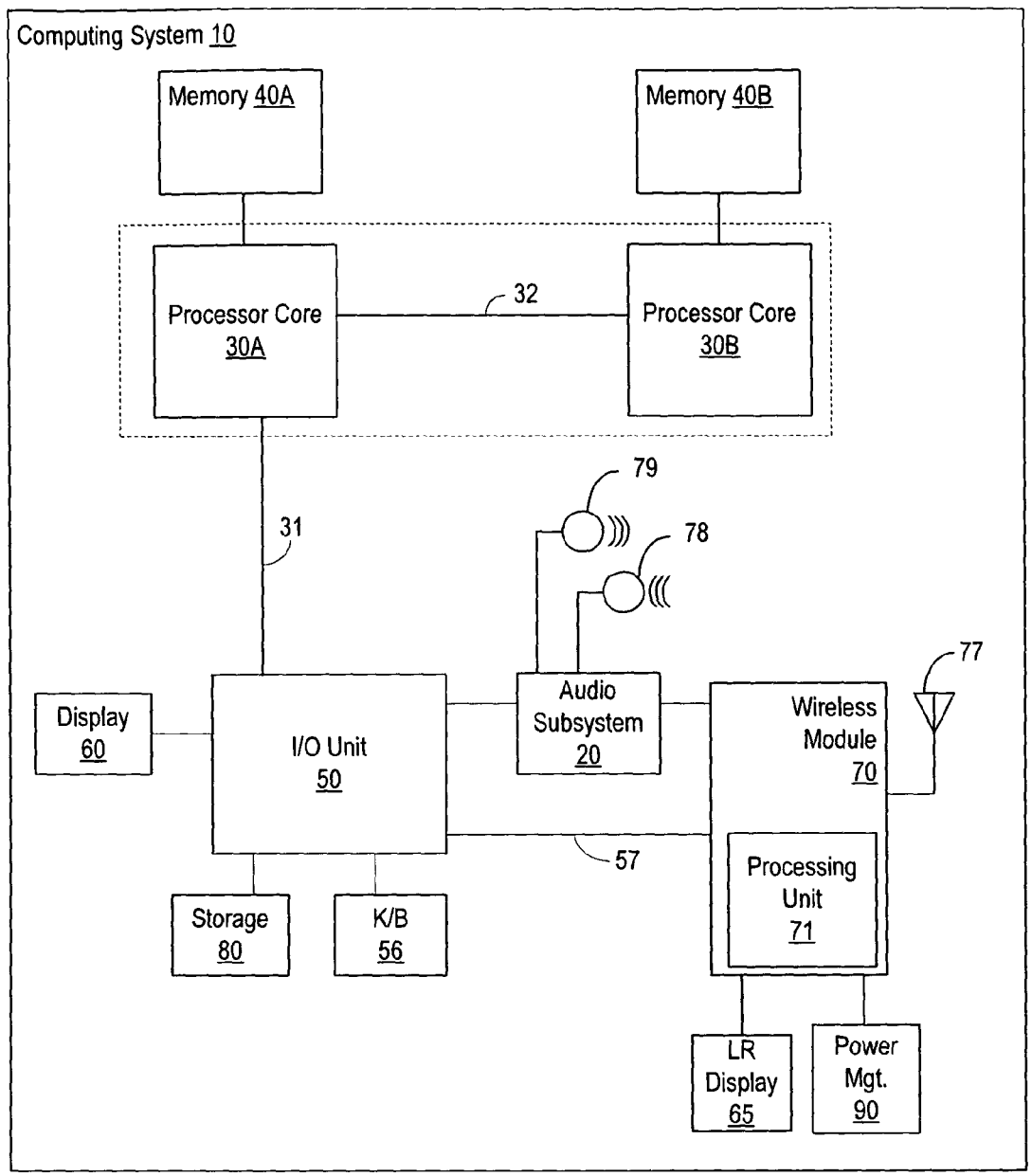
FIG. 2 is a block diagram of one embodiment of a multiple mode portable computer system including wireless communication functionality.

Referring to FIG. 2, a block diagram of one embodiment of a multiple mode portable computer system including wireless communication is shown. It is noted that components corresponding to those shown in FIG. 1 are numbered identically for clarity and simplicity. Portable computer system 10 has similarities to the portable computer system shown in FIG. 1. However, instead of a single processor 30 and a single memory 40, the portable computer system 10 of FIG. 2 includes two processors that are designated processor 30A and a processor 30B and a memory 40A and a memory 40B that are coupled to processors 30A and 30B, respectively. As shown, processors 30A and 30B are coupled together and processor 30A is coupled to I/O unit 50.

It is noted that processors 30A and 30B may be heterogeneous processors. As such, processors 30A and 30B may not only be physically discrete processors, they may also be dissimilar and/or have different operational characteristics. For example, in one embodiment, processor 30A may include functionality that is not included in processor 30B. In another embodiment, processor 30A may have higher performance than processor 30B. To illustrate using a simple example, processor 30A may be capable of operating at 3.0 GHz while processor 30B may only be capable of operating at 2.0 GHz. As another example, processor 30A may be a 64-bit processor while processor 30B may only be a 32-bit processor. Accordingly, processor 30A although processor 30A may be used to run the same applications as processor 30B, processor 30A may instead be used to run applications in which high performance is desirable. Along the same lines, processor 30B may be used to run applications in which high performance may not necessarily be desirable and/or lower power consumption may be desirable. In another embodiment, processors 30A and 30B may be heterogeneous processor cores implemented within a multicore processing unit, as denoted by the dashed lines. In such an embodiment, for example, processor 30B may be throttled or otherwise performance limited to run at a lower frequency, or alternatively, processor 30B may have certain features disabled when compared to processor 30A. As will be described further below performance differences may be exploited to consume less power in instances when less performance may be desirable or tolerated.

In one embodiment, processors 30A and 30B may each be illustrative of a microprocessor that implements the x86 architecture. Although in other embodiments, processor 30A and 30B may each be any type of processor.

In one embodiment, processors 30A and 30B may include a memory controller (not shown) to facilitate memory transactions directed to memory 40A and 40B respectively, for example. Processor 30A is coupled to processor 30B via an interconnect 32. In one embodiment, interconnect 32 may include a pair of unidirectional links such as may be implemented in a HyperTransport™ link, for example, and configured to convey packetized information. However, it is possible and contemplated that interconnect 32 may be implemented using other interconnects.

In the illustrated embodiment, I/O unit 50 may be any of a variety of I/O controllers that may include bridging and graphics circuits (not shown) that may be used as interfaces between processors 30A and 30B and the various I/O devices and buses to which it is coupled. For example, in one embodiment, I/O unit 50 may be coupled to processor 30A via a HyperTransport™ link 31. In addition, processor 30A may include various interface circuits such as a host interface (not shown) for controlling transactions with I/O unit 50 and processor 30B. In such an embodiment, I/O unit 50 may include one or more HyperTransport™ to peripheral component interconnect (PCI) and/or a HyperTransport™ to universal serial bus (USB) bridges for connection to PCI and USB devices, respectively, for example. In addition, as shown I/O unit 50 is coupled to wireless module 70 via link 57. In various embodiments, link 57 may be implemented as a USB, HyperTransport™, or other type of interconnect. Further, I/O unit 50 may include graphics functionality for generation of the various signals used in association with display 60, for example.

As an extension of the above example in which processors 30A and 30B may be heterogeneous, memory 40A and memory 40B may be heterogeneous. In one exemplary embodiment, memory 40A may be a higher performance memory than memory 40B. As such memory 40B may consume less power than memory 40A. Thus, when the extra performance is not needed, processor 30B and memory 40B may be used instead of processor 30A and memory 40A. Similarly, LR display 65 may be a low-resolution display as described above. As such, LR display 65 may consume less power than display 60. Accordingly, depending on the application, the use of LR display 65 may be more than adequate.

Further, as shown, wireless module 70 includes a processing unit 71 that may, in various implementations, include a separate processor such as an ARM processor, for example. As such, in one embodiment, the processor within processing unit 71 may be used while both processor 30A and 30B may be off or in low power states such as standby or sleep mode, for example.

As mentioned above, the various operating environments may correspond to several different modes of operation. The different modes may be configurable through hardware and/or software mechanisms made available via control panel drivers and software applications, for example. Thus, portable computer system 10 may be operated in various modes that include combinations of operational states of the different components. For example as described above, in one mode, processor 30A and processor 30B may be in a low power mode such as a sleep mode while processing unit 71 may be active and operational. In such an embodiment, LR display 65 may also be active. As such, in response to an incoming telephone call, a user may answer the call while possibly allowing portable computer system 10 to conserve power. Thus in such a mode, LR display 65 may display lower resolution information such as text and low-level graphics, for example. In another mode, processor 30A may be in a low power mode and processor 30B may be actively executing instructions that may correspond to simple web browsing or word processing application using display 60 or LR display 65. In another mode, processor 30A may be in a low power mode and processor 30B may be actively executing instructions that may correspond to an email application using LR display 65. In one embodiment, depending upon user selected preferences, in response to selecting an attachment of an incoming email, the attachment may open using the appropriate software application and display 60 may automatically become active to display the attachment. In yet another mode, processor 30B may be in a low power mode and processor 30A may be active and executing instructions that correspond to a gaming application or a high-level graphics application, for example. It is noted that in any mode, the wireless module 70 may be either active or inactive depending upon user preferences. It is also noted that the modes described above are merely exemplary modes for discussion purposes. Accordingly, in other embodiments other modes and other mode combinations are possible and contemplated.

During operation in the various modes, in one embodiment, power management unit 90 may be configured to provide the necessary signals to cause the different components to operate in various power states. For example, depending on selected preferences, power management unit 90 may receive signals indicative of a mode change. In response, power management unit 90 may generate signals such as interrupt signals and/or other encoded signals that may cause a given component to enter a particular power state. In one embodiment, the preferences may be default system settings. In another embodiment, the preferences may be system settings that are selectable by a use via driver software, for example.

It is noted that although the embodiments above in conjunction with the description of FIG. 2 have been described in the context of a portable computer, it is contemplated that the notion of using heterogeneous processors and multiple modes may be extended to any type of system in which power and/or performance management across different applications may be desirable. In addition, it is further noted that although two heterogeneous processors are shown, it is contemplated that other numbers of processors may be used, which may increase the number of possible modes of operation.

Figure 3A:
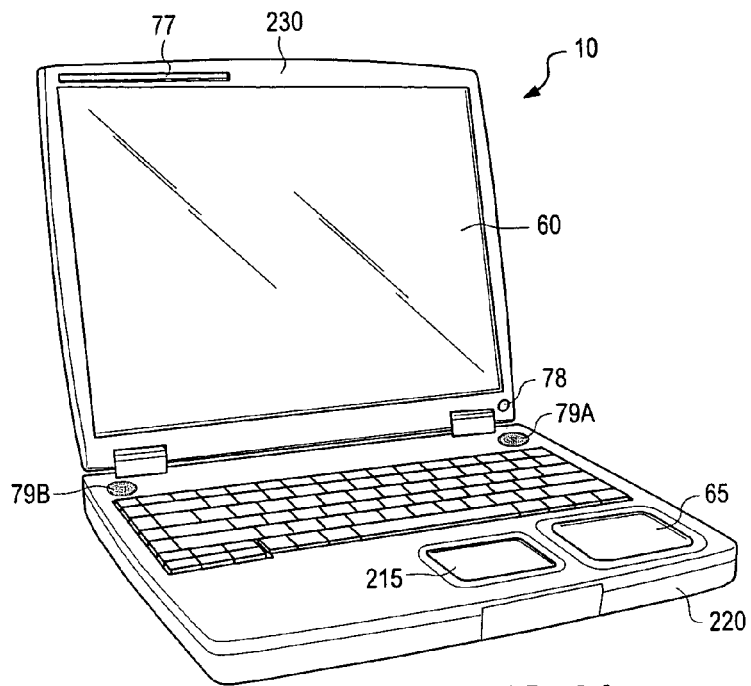
FIG. 3A is a perspective view drawing of one embodiment of the portable computer system of FIG. 1 and FIG. 2.
Figure 3B:
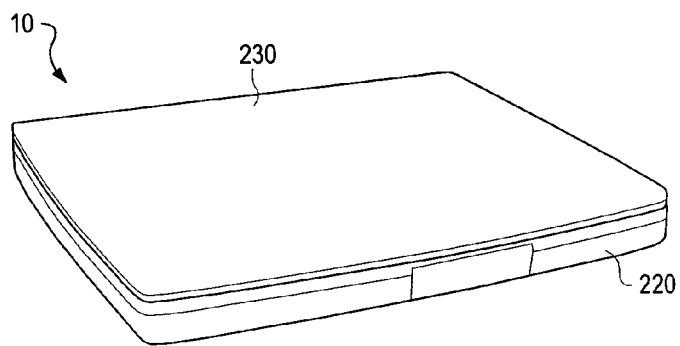
FIG. 3B is a perspective view drawing of the embodiment of the portable computer system of FIG. 3A with the cover in a closed position.

FIG. 3A and FIG. 3B are perspective view drawings of an exemplary embodiment of a portable computer system including wireless telephony. FIG. 2A depicts the portable computer system 10 as a laptop computer (i.e., a notebook computer) that includes a housing 220 with a hingably attached cover 230 that is in an open position. FIG. 2B depicts the portable computer system 10 shown in FIG. 2A with cover 230 in a closed position.

In FIG. 3A, the cover 230 includes a display 60 such as an LCD, microelectro-mechanical (MEMS), or electronic ink (Eink), for example, that forms a part of the internal surface of the cover. In addition, in the illustrated embodiment, portable computer system 10 includes an antenna 77 that is mounted to cover 230. It is noted that the mounting location and type of antenna 77 are implementation details. Accordingly, although antenna 77 is shown mounted to the inside of cover 230, in other embodiments, antenna 77 may be mounted to cover 230 or housing 220, or even internal to housing 220 as desired. In addition, antenna 77 may go entirely or partially around display 60.

Portable computer system 10 also includes a microphone 78, speakers 79A and 79B, and a keyboard 240, and a touch activated mouse control 215 that are mounted on a top surface of the housing 220. In addition, portable computer system 10 includes an additional display unit (e.g., LR display 65) mounted to the top surface of housing 220. As described above, in one embodiment, display 65 may be a low-resolution display. In various other embodiments, LR display 65 may also be an input device (e.g., touch-activated screen) to facilitate use of a pointing device such as a stylus, for example. As such, LR display 65 may include analog-to-digital conversion circuits to input data from the screen. It is noted that the location and type of LR display 65 are also implementation details. As such, LR display 65 may be located in any desired location, an example of which is shown in FIG. 3A.

Figure 4A:
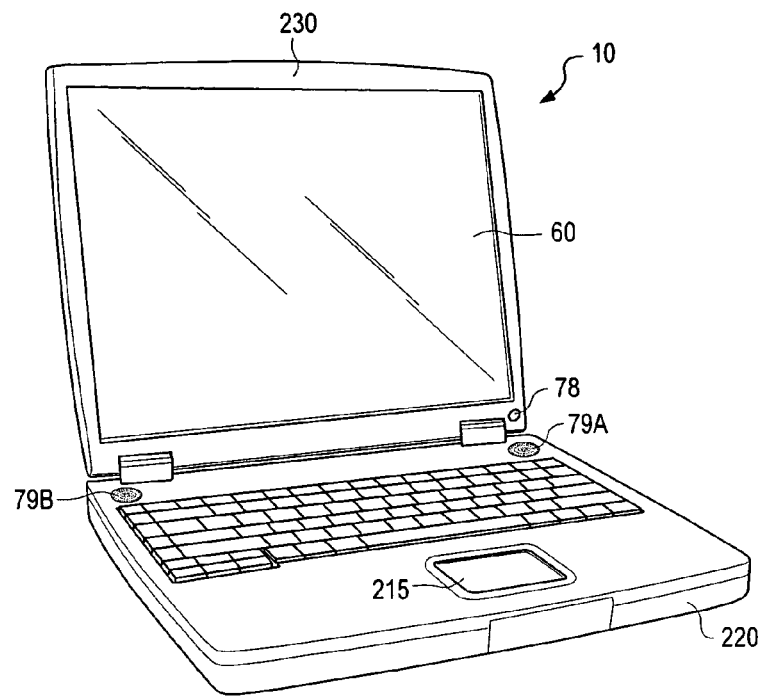
FIG. 4A is a perspective view drawing of another embodiment of the portable computer system of FIG. 1 and FIG. 2.
Figure 4B:
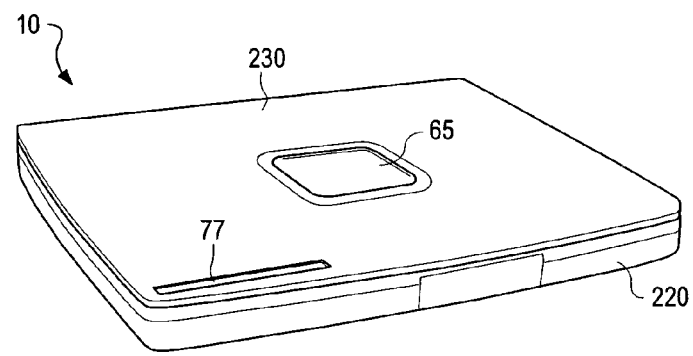
FIG. 4B is a perspective view drawing of another embodiment of the portable computer system of FIG. 1 and FIG. 2.

FIG. 4A and FIG. 4B are perspective view drawings of another embodiment of portable computer system 10. More particularly, the embodiment of portable computer system 10 shown in FIG. 4A is similar to the embodiment shown in FIG. 3A. However, the embodiment of portable computer system 10 shown in FIG. 4A does not include LR display 65 mounted on the top surface of housing 220. Instead, as illustrated in FIG. 4B, LR display 65 is mounted on the external surface of cover 230 such that LR display 65 is visible and useable when cover 230 is in the closed position. In addition as noted above, in the illustrated embodiment, antenna 77 is mounted on the external surface of cover 230.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A portable computer system comprising:
    a first processor configured to execute instructions corresponding to application software during a first mode of operation;
    a second processor configured to execute the instructions during a second mode of operation;
    wherein the first processor and the second processor are heterogeneous processors;
    wherein operation of the first processor and the second processor in the first mode and the second mode is dependent upon which of a plurality of system preferences have been selected; and
    a wireless module configured to provide wireless access to a wireless network;
    wherein the wireless module includes a processing unit including a digital signal processing unit and a third processor that is separate from the digital signal processing unit, the first processor, and the second processor.

2. The portable computer system as recited in claim 1, further comprising a power management unit configured to cause the first processor and the second processor to operate in the first mode and the second mode.

3. The portable computer system as recited in claim 1, wherein one or more of the plurality of system preferences are selected by a user.

4. The portable computer system as recited in claim 1, wherein the digital signal processing unit is configured to perform functions associated with digital signal processing of audio signals.

5. The portable computer system as recited in claim 1, wherein during a third mode of operation, the first processor and the second processor are in a reduced power state and the third processor and the digital signal processing unit are in a fully operational state.

6. The portable computer system as recited in claim 5, wherein during a fourth mode of operation the first processor in the fully operational state and configured to execute the instructions and the second processor is in the fully operational state and configured to execute different instructions corresponding to different application software.

7. The portable computer system as recited in claim 1, wherein during the first mode of operation, the second processor is in a reduced power state, and the third processor and the digital signal processing unit are in a fully operational state.

8. The portable computer system as recited in claim 1, wherein during the second mode of operation, the first processor is in a reduced power state and the third processor and the digital signal processing unit are in a fully operational state.

9. The portable computer system as recited in claim 1, wherein during the second mode of operation, the first processor, the third processor and the digital signal processing unit are in a reduced power state.

10. The portable computer system as recited in claim 1, further comprising a first display configured to display first information during the first mode of operation.

11. The portable computer system as recited in claim 10, wherein the first display is configured to display second information during the second mode of operation.

12. The portable computer system as recited in claim 11, further comprising a second display configured to display third information during the second mode of operation.

13. The portable computer system as recited in claim 12, wherein the second display is configured to display fourth information during the third mode of operation.

14. The portable computer system as recited in claim 13, wherein the first display is configured to display the third information and the fourth information during a fourth mode in response to a user selected preference.

15. The portable computer system as recited in claim 12, wherein the second display has a lower resolution than a resolution of the first display.

16. The portable computer system as recited in claim 1, further comprising a second memory coupled to the second processor and configured to store the instructions.

17. A portable computer system comprising:
a first processor configured to execute instructions corresponding to application software during a first mode of operation;
a second processor configured to execute the instructions during a second mode of operation; and
an input/output (I/O) hub coupled to communicate with the first processor and the second processor and configured to distribute transactions between the first and the second processor and a plurality of I/O devices;
wherein the first processor and the second processor are heterogeneous processors; and
wherein operation of the first processor and the second processor in the first mode and the second mode is dependent upon which of a plurality of system preferences have been selected.

18. A portable computer system comprising:
a first processor configured to execute instructions corresponding to application software;
a second processor configured to execute the instructions;
wherein the first processor and the second processor are heterogeneous processors; and
a power management unit coupled to the first processor and the second processor and selectably configured to cause one of the first processor and the second processor to execute the instructions;
wherein the power management unit is further selectably configured to cause the first processor to operate in the fully operational state while executing the instructions, and to cause the second processor to operate in the fully operational state while executing different instructions corresponding to different application software.

19. The portable computer system as recited in claim 18, wherein the power management unit is selectably configured via one or more of a plurality of system preferences selected by a user.

20. A portable computer system comprising:
a first processor configured to execute instructions corresponding to application software;
a second processor configured to execute the instructions;
wherein the first processor and the second processor are heterogeneous processors;
a power management unit coupled to the first processor and the second processor and selectably configured to cause one of the first processor and the second processor to execute the instructions; and
a wireless module including a processing unit configured to provide wireless access to a wireless network;
wherein the processing unit includes a digital signal processing unit and a third processor that is separate from the digital signal processing unit, the first processor, and the second processor.

21. The portable computer system as recited in claim 20, wherein the digital signal processing unit is configured to perform functions associated with digital signal processing of audio signals.

22. The portable computer system as recited in claim 20, wherein the power management unit is further selectably configured to cause the first processor and the second processor to operate in a reduced power state while the third processor and the digital signal processing unit operate in a fully operational state.

23. A portable computer system comprising:
a first processor configured to execute instructions corresponding to application software;
a second processor configured to execute the instructions;
wherein the first processor and the second processor are heterogeneous processors; and
a power management unit coupled to the first processor and the second processor and selectably configured to cause one of the first processor and the second processor to execute the instructions;
wherein the power management unit is further selectably configured to cause the first processor to operate in a reduced power state while the second processor executes different instructions corresponding to different application software.

24. A portable computer system comprising:
a first processor configured to execute instructions corresponding to application software;
a second processor configured to execute the instructions;
wherein the first processor and the second processor are heterogeneous processors; and
a power management unit coupled to the first processor and the second processor and selectably configured to cause one of the first processor and the second processor to execute the instructions;
wherein the power management unit is further selectably configured to cause the second processor to operate in a reduced power state while the first processor executes the instructions.

25. A portable computer system comprising:
a first processor configured to execute instructions corresponding to application software;
a second processor configured to execute the instructions;

wherein the first processor and the second processor are heterogeneous processors; and a power management unit coupled to the first processor and the second processor and selectably configured to cause one of the first processor and the second processor to execute the instructions;

wherein the power management unit is further selectably configured to cause the first processor to operate in a reduced power state while the second processor executes the instructions.

* * * * *